United States Patent
Culliss

(10) Patent No.: US 6,816,850 B2
(45) Date of Patent: *Nov. 9, 2004

(54) PERSONALIZED SEARCH METHODS INCLUDING COMBINING INDEX ENTRIES FOR CATAGORIES OF PERSONAL DATA

(75) Inventor: Gary A. Culliss, Overland Park, KS (US)

(73) Assignee: Ask Jeeves, Inc., Emeryville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/392,510

(22) Filed: Mar. 20, 2003

(65) Prior Publication Data

US 2003/0187837 A1 Oct. 2, 2003

Related U.S. Application Data

(63) Continuation of application No. 09/684,209, filed on Oct. 6, 2000, now Pat. No. 6,539,377, which is a continuation of application No. 09/259,600, filed on Mar. 1, 1999, now Pat. No. 6,182,068, which is a continuation-in-part of application No. 09/041,411, filed on Mar. 12, 1998, now Pat. No. 6,078,916, and a continuation-in-part of application No. 08/960,140, filed on Oct. 29, 1997, now Pat. No. 6,014,665, and a continuation-in-part of application No. 08/904,795, filed on Aug. 1, 1997, now Pat. No. 6,006,222.

(51) Int. Cl.[7] ............................................. G06F 17/30
(52) U.S. Cl. ........................................................ 707/1
(58) Field of Search ............................... 707/1, 2, 3, 5, 707/10

(56) References Cited

U.S. PATENT DOCUMENTS

| | | |
|---|---|---|
| 5,278,980 A | 1/1994 | Pedersen et al. |
| 5,321,833 A | 6/1994 | Chang et al. |
| 5,535,382 A | 7/1996 | Ogawa |
| 5,754,939 A | 5/1998 | Herz et al. |
| 5,758,257 A | 5/1998 | Herz et al. |
| 5,835,087 A | 11/1998 | Herz et al. |
| 5,907,836 A | 5/1999 | Sumita et al. |
| 6,029,195 A | 2/2000 | Herz |
| 6,138,562 A | 10/2000 | Hertz |
| 6,195,657 B1 | 2/2001 | Rucker et al. |
| 6,285,999 B1 | 9/2001 | Page |

OTHER PUBLICATIONS

Chakrabarti, "Automatic Resource Compilation by Analyzing Hyperlink Structure and Associated Text." http://www7.scu.edu.au/programme/fullpapers/1898/com1898.html. pp. 1–14.

Dongarra, Jack J., "An Extended Set of FORTRAN Baslc Linear Algebra Subprograms." ACM Transactions on Mathematical Software, vol. 14, No. 1, Mar. 1988. pp. 1–17.

Mizruchi, Mark S., "Techniques for Disaggregating Centrality Scores in Social Networks." In N.B. Tuma, Editor, Sociological Methodology, pp. 26–48. Jossey–Bass, San Francisco, 1986.

Kimoto et al. "A Dynamic Thesaurus and Its Application to Associated Information Retrival" IJCNN–91–Seattle, vol. 1, pp. 19–29, Jul. 1991.

Bidmead, C. "Windows Personal Librarian" Which Computer?, vol. 16, No. 10, pp. 23, Oct. 1993.

(List continued on next page.)

Primary Examiner—Jack Choules
(74) Attorney, Agent, or Firm—Wong, Cabello, Lutsch, Rutherford & Brucculeri, P.C.

(57) ABSTRACT

A method of organizing information in which the search activity of previous users is monitored and such activity is used to organize articles for future users. Personal data about future users can be used to provide different article rankings depending on the search activity and personal data of the previous users. The personal data is used in the development of an index, the index including entries for specific categories of personal data. The similarity or difference in the prior results for a query term determine if separate index entries are needed for the categories and terms being considered.

4 Claims, 1 Drawing Sheet-

OTHER PUBLICATIONS

Figure 1:
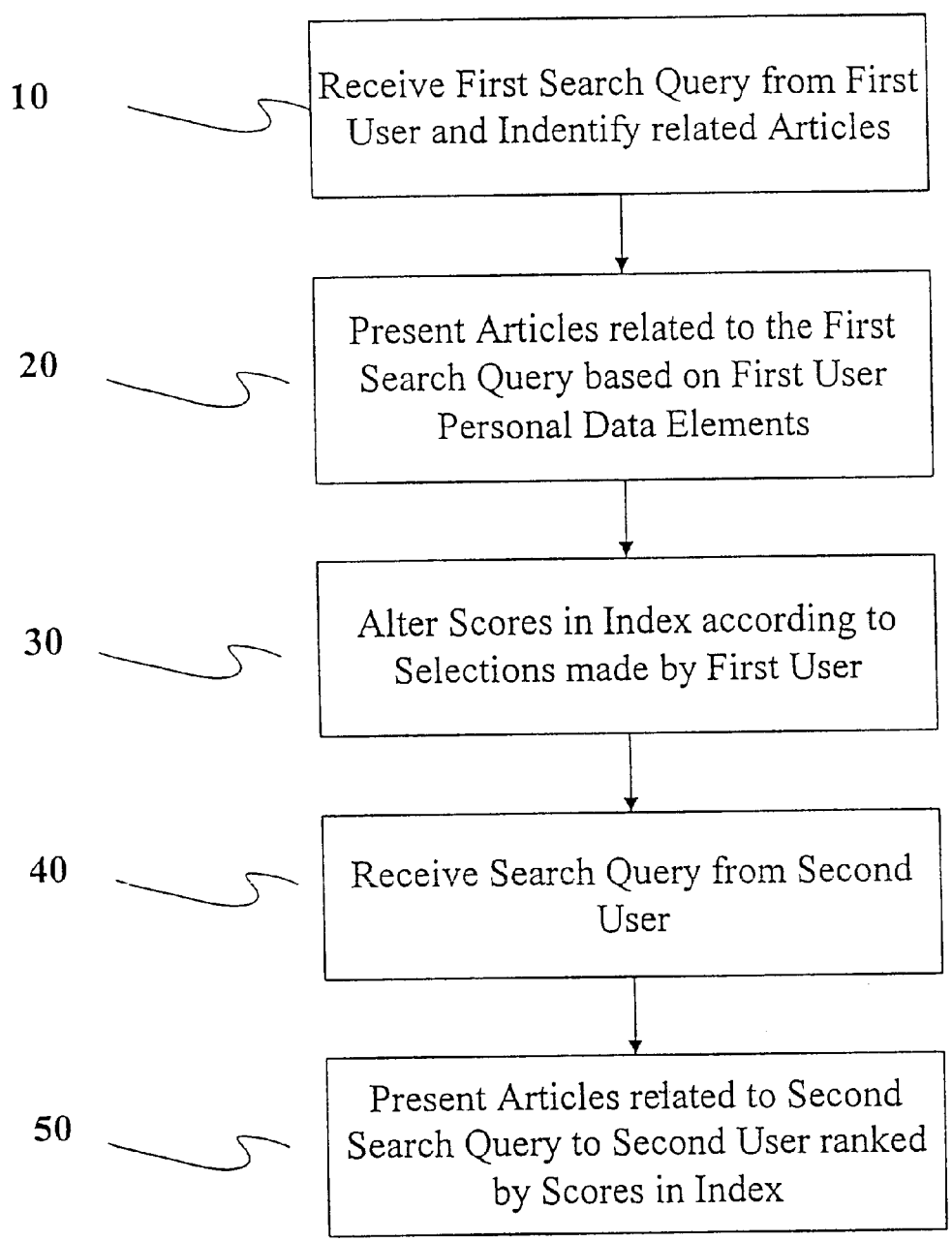

Savoy, "A New Probabilistic Scheme for Information Retrieval in Hypertext", New Review of Hypermedia and Multimedia, Applications and Research, vol. 1, pp. 107–134, 1995.

Fuhr et al. Probabilistic Learning Approaches for Indexing and Retrieval with the TREC–2 Collection, TREC Text Retrieval Conference, pp. 67–74, 1993.

Bharat, "The Connectivity Server: Fast Access to Linkage Information on the Web" http://decweb.ethz.ch/WWW7/1938.htm pp. 1–13, Apr., 1998.

Brin, "The Anatomy of a Large–Scale Hypertextual Web Search Engine." http://www7.scu.edu.au/programme/fullpapers/1921/com1921.htm. pp. 1–20, Apr. 1998.

Chakrabarti, "Experiments in Topic Distillation." http://almaden.ibm.com/cs/k53/abstract.html. pp. 1–6. No Date.

Chakrabarti, "Automatic Resource Compilation by Analyzing Hyperlink Structure and Associated Text." http://www7.scu.edu.au/programme/fullpapers/1898/com1898.html. pp. 1–14, Apr. 1998.

Davison, Brian D., "DiscoWeb: Applying Link Analysis to WebSearch." http://www.cs.rutgers.edu/~davison/pubs/www99.html. pp. 1–4, 1999.

Gibson, David, "Inferring Web Communities from Link Topology." http://www.c-s.cornell.edu/home/kleinber/ht98.ps. pp. 1–17, 1998.

Kleinberg, Jon M. "Authoritative Sources in a Hyperlinked Environment." http://www.cs.corneil.edu/home/kleinber/auth.pdf. pp. 1–34, 1998.

PERSONALIZED SEARCH METHODS INCLUDING COMBINING INDEX ENTRIES FOR CATAGORIES OF PERSONAL DATA

RELATED DISCLOSURES

This patent application relates to subject matter disclosed in Disclosure Document Numbers 411,887; 417,369; 417,458 and 442,322.

RELATED APPLICATIONS

This patent application is a continuation of Ser. No. 09/684,209 filed Oct. 6, 2000 now U.S. Pat. No. 6,539,377, which is a continuation of Ser. No. 09/259,600 filed Mar. 1, 1999 now U.S. Pat. No. 6,182,068, which is a continuation in part of three co-pending patent applications, Ser. No. 08/904,795 now U.S. Pat. No. 6,006,222, Ser. No. 08/960,140 now U.S. Pat. No. 6,014,665 and Ser. No. 09/041,411 now U.S. Pat. No. 6,078,916, filed Aug. 1, 1997, Oct. 29, 1997 and Mar. 12, 1998, respectively, all entitled "Method For Organizing Information."

FIELD OF THE INVENTION

The present invention relates to search engines, and more particularly pertains to a method for organizing information by monitoring the search activity and personal data of searchers.

BACKGROUND OF THE INVENTION

The Internet is an extensive network of computer systems containing hundreds of millions of documents, files, databases, text collections, audio clips, video clips and samples of any other type of information (collectively "articles"). As explained in my earlier referenced patent applications, search engines are used to locate articles over the Internet. Given the large amount of information available over the Internet, it is desirable to reduce this information down to a manageable number of articles which fit the needs of a particular user.

OBJECTS AND SUMMARY OF THE INVENTION

Accordingly, it is an object of the invention to organize articles available over the Internet or within any other collection of information.

It is another object of the present invention to monitor searching activity to organize articles in accordance with the searching activity of one or more users.

It is another object of the present invention to utilize personal data about a searcher to organize articles in accordance with the searching activity of one or more users.

To accomplish these and other objects, the present invention generally comprises a method for organizing information in which the search activity of previous users is monitored and such activity is used to organize articles for future users. Personal data about future users can be used to provide different article rankings depending on the search activity and personal data of the previous users.

This brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the method set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other methods and systems for carrying out the objects and purposes of the present invention. It is important, therefore, that the claims be regarded as including such equivalent constructions insofar as they do not depart from the spirit and scope of the present invention.

DESCRIPTION OF THE PREFERRED EMBODIMENTS

The Internet is an extensive network of computer systems containing hundreds of millions of documents, files, databases, text collections, audio clips, video clips and samples of any other type of information, collectively referred to as articles and designated herein by the generic labels A1, A2, A3, etc.

As described in my previous applications, the present invention maintains an index of key words, terms, data or identifiers in English or other languages, computer code, or encryption which are collectively referred to as key terms and represented herein by the generic labels "Alpha," "Beta," "Gamma," "Delta," "Epsilon," etc.

The articles can each be associated with one or more of these key terms by any conceivable method of association now known or later developed. A key term score is associated with each article for each of the key terms. Optionally, a key term total score can also be associated with the article.

As described in my previous applications, the invention can accept a search query from a user and a search engine will identify matched articles and display squibs of the matched articles in accordance with their comparison scores. Articles can have their key term scores or key term total scores altered according to whether they were displayed to a user, whether they were selected by a user, how much time the user spent with the article, etc. In this application, the phrase previous-user relevancy score, designated by the generic label "PRS," will be used to refer to any of the key term score, key term total score, key term probability score, comparison score, or other ranking score determined by the previous search activity of users.

For example, with the key term scores and key term total scores shown in parentheses, the index may look like this:

| Index | |
|---|---|
| Alpha | A1 (PRS), A2 (PRS), A3 (PRS) |
| Beta | A1 (PRS) |
| Gamma | A1 (PRS), A3 (PRS) |
| Delta | A2 (PRS), A3 (PRS) |
| Epsilon | A1 (PRS), A3 (PRS) |
| Etc. | Etc. |

By storing key term groupings of two or more key terms, the index may look like this:

| Index | |
|---|---|
| Alpha-Beta | A1 (PRS), A2 (PRS), A3 (PRS) |
| Beta-Gamma | A1 (PRS) |
| Gamma-Delta | A1 (PRS), A3 (PRS) |
| Delta-Epsilon | A2 (PRS), A3 (PRS) |
| Epsilon-Zeta-Theta | A1 (PRS), A3 (PRS) |
| Etc. | Etc. |

Personal Data

The present embodiment of the invention utilizes personal data to further refine search results. Personal data includes, but is not limited to, demographic data, psychographic data, personal interest data, personal activity data or other data about users. Personal data can be represented by the generic label "PS." Individual elements of personal data can be represented by the generic labels "PS1," "PS2," "PS3," etc.

Demographic data includes, but is not limited to, items such as age, gender, geographic location, country, city, state, zip code, income level, height, weight, race, creed, religion, sexual orientation, political orientation, country of origin, education level, criminal history, or health. Psychographic data is any data about attitudes, values, lifestyles, and opinions derived from demographic or other data about users.

Personal interest data includes items such as interests, hobbies, sports, profession or employment, areas of skill, areas of expert opinion, areas of deficiency, political orientation, or habits. Personal activity data includes data about past actions of the user, such as reading habits, viewing habits, searching habits, previous articles displayed or selected, previous search requests entered, previous or current site visits, previous key terms utilized within previous search requests, and time or date of any previous activity.

A searcher who does not possess certain personal data characteristics, such as being a doctor, for example, could also choose to see articles ranked according to the searching activity of previous searchers who were doctors, as described below. In this respect, then, it is possible for a search request to specify the type of personal data previous searchers should have had, even if the current (or second) searcher does not actually have that personal data characteristic.

Inferring Personal Data

Users can explicitly specify their own personal data, or it can be inferred from a history of their search requests or article viewing habits. In this respect, certain key words or terms, such as those relating to sports (i.e. "football" and "soccer"), can be detected within search requests and used to classify the user as someone interested in sports. Also, certain known articles or URLs can be detected in a users searching or browsing habits, such as those relating to CNNfn (www.cnnfn.com) or Quote.com (www.quote.com), and also used to classify the user as someone interested in finance.

A cumulative score can be kept with regard to these occurrences of certain classified key terms, queries or visited URLs to quantify how strongly someone is associated with a particular item of personal data. The score can be normalized over time, frequency or other activity such as the number of searches performed, the amount of time spent online, the amount of time spent browsing on a particular subject, the number of URLs or articles selected for a particular subject, or otherwise.

For example, assume a user has entered the following ten search requests and visited the following articles or URLs:

| Index for Search Requests or Browsing Topics |
|---|
| stock quotes |
| sports scores |
| Cnnfn |
| junk bonds |
| Cars |
| down comforters |
| stock quotes |
| dow jones |
| Football |
| nba |

| Index for Articles or URLs |
|---|
| www.cnnfn.com |
| www.wsj.com |
| www.nba.com |
| www.sportsline.com |
| www.marketwatch.com |
| Etc. |

Given a correlation chart between certain key terms and certain items or personal data such as the following:

| Index for Search Requests or Browsing Topics | |
|---|---|
| Item of Personal Data | Key Words or Queries |
| Sports Interest | football |
| | sports |
| | scores |
| | hockey |
| | jets |
| | nba |
| | etc. |
| Finance Interest | stocks |
| | bonds |
| | tech stocks |
| | cnnfn |
| | dow jones |
| | etc. |

| Index for Articles or URLs | |
|---|---|
| Item of Personal Data | Articles or URLs |
| Sports Interest | sportsline.com |
| | nba.com |
| | etc. |
| Finance Interest | cnnfn.com |
| | wsj.com |
| | marketwatch.com |
| | etc. |

Then, the user can be identified as having the personal data characteristic of being a sports fan and having an interest in finance because there are three queries relating to sports ("sports scores," "football," and "nba") and five queries containing key words relating to finance ("stock quotes," "cnnfn," "junk bonds," "stock quotes," and "dow jones") This can be done by keeping a cumulative score for a user for search requests or URLs. For example, whenever there is a match (whole or partial) between a search request or URL and an item of personal data, a record for the user can be updated to give a +1 for that item of personal data. A cumulative score can be developed for the user for each item of personal data, called a personal data item score. When the personal data item score of the user reaches a certain threshold, then the item of personal data can be said to be associated with the user. Additionally or alternatively, the strength of the association can be determined by the cumulative personal data item score. The personal data item score for each item of personal data can be normalized by any normalizing factor, such as the number of requests entered, the number of URLs visited, the average personal data item score for other users in that item of personal data, the median personal data item score for other users in that item of personal data or otherwise.

Similarly, the same analysis can be done with URLs or articles that are deemed to relate to certain items or personal data as well that the user has visited. Particular queries can include terms from more than one personal data classification and thus indicate more than one item of personal data for the user.

Tracking Personal Data

When a first user enters a search query, the personal data can be considered part of the request and stored within or added to the index, individually or in groupings with other items of data such as key terms, categories, or ratings. For example, after receiving a number of queries, the index may look like this:

| Index | |
|---|---|
| Alpha | A1 (RS), A2 (RS), A3 (RS) |
| Alpha-PS2 | A1 (RS), A3 (RS) |
| Beta-Gamma | A1 (RS) |
| Gamma-Delta-PS4 | A1 (RS), A3 (RS) |
| Delta-Epsilon | A2 (RS), A3 (RS) |
| Epsilon-Zeta-PS1 | A1 (RS), A3 (RS) |
| Epsilon-PS3-PS7 | A3 (RS) |
| Etc. | Etc. |

The personal data can be used to recall different lists of articles in response to new queries from new users. In this respect, it is possible to simply store all elements of personal data, individually or in key term groupings, within the index separately, with components of the query or otherwise. When the next user enters a search request, the search request and the user's personal data are combined to form groupings containing key term groupings, key terms and personal data groupings, category and personal data groupings, rating and personal data groupings, etc. Articles associated with these groupings are then retrieved from the index, and their relevancy scores are used or combined to determine their rankings.

For example, if a first user enters a search request of Alpha and has personal data characteristics of PS1 and PS5, then the request can be combined with the personal data to form the following groupings: Alpha-PS1 and Alpha-PS5. In addition, other groupings or permutations such as PS1–PS5 and Alpha-PS1–PS5 are also possible and can be stored within the index. These groupings are stored within the index and the relevancy scores of selected articles are updated according to methods described in my previous applications To initially retrieve articles for presentation to the first user using a conventional search engine, just the key term "Alpha" can be used as a key term to pull articles from within an index.

When a second searcher actually having, or who has selected to see results from other searchers having, personal data characteristics of at least PS5 searches for Alpha, for example, then the relevancy scores of articles under at least the grouping Alpha-PS5 can be used to rank the articles according to methods described in my previous applications. Similarly, a searcher having or selecting personal data characteristic of PS1 searching for Alpha can see articles ranked according to methods described in my previous applications by the relevancy scores of articles under at least the grouping Alpha-PS1. A searcher having or selecting personal data characteristics of PS1 and PS5 searching for Alpha can see articles ranked according to methods described in my previous applications by the relevancy scores of articles under any of groupings Alpha-PS1, Alpha-PS5, and Alpha-PS1–PS5, as desired.

In this manner, the relevancy of articles is determined by the searching activity of previous searchers which share, or are indicated as having, certain personal data characteristics.

As mentioned above, a searcher who does not possess certain personal data characteristics, could also choose to see articles ranked according to the searching activity of previous searchers who have a certain characteristic, in which case the user should simply specify the personal data characteristic the user desires.

Identifying Relevant Personal Data

It is possible that not all elements of personal data will result in different rankings of articles under certain key terms or key term groupings. To save storage space and processing time, it is desirable to determine which personal data characteristics result in different rankings.

One way to determine which personal data characteristics result in different rankings is to compare the previous-user relevancy scores, or ranking determined at least in part by the previous user relevancy scores, of articles under certain key terms or key term groupings in which a particular personal data characteristic is different. For example, articles under a search query or key term such as "shoes" may have different relevancy scores depending on whether the previous searchers were women or men, whereas the rankings may not be different for a personal data characteristic such as political orientation.

For example, the index for the following key term groupings for the key term "shoes," with the previous-user relevancy scores in parentheses, may look like this:

| Index | |
|---|---|
| Shoes | A1 (5), A2 (4), A3 (3), A4 (2), A5 (1) |
| Shoes-Women | A1 (1), A2 (2), A3 (3), A4 (4), A5 (5) |
| Shoes-Men | A1 (5), A2 (4), A3 (3), A4 (2), A5 (1) |
| Shoes-Republican | A1 (5), A2 (4), A3 (3), A4 (2), A5 (1) |
| Shoes-Democrat | A1 (5), A2 (4), A3 (3), A4 (2), A5 (1) |

Here, the previous-user relevancy scores of the articles under Shoes-Men and Shoes-Women are different. The magnitude of difference deemed appropriate to identify relevant personal data for a particular key term, grouping of key terms, or query is adjustable. For example, one standard might be if the rankings of five or more of the top 10 articles when ranked in any manner according to their previous-user relevancy scores are significantly different, then the particular element of personal data can be deemed relevant. Of course, some articles may not even be listed under some groupings, indicating that their previous-user relevancy scores are quite different. By "significantly different" is meant different enough so that a user might prefer to see a different ranking based on his or her personal data.

When comparing different combinations of personal data, the aforementioned analysis is preferably performed on groupings in which one item of a similar type of personal data is varied. For example, the analysis may look at men compared to women, republicans compared to democrats, or certain professions compared to other professions, etc. Personal data which is not relevant to creating differently ranked articles can be tagged, removed from the index or not stored in the index at all.

When a new search request is submitted by a new or second user, the groupings containing parts of the search request and personal data of the second user (or selected by the second user) which are in the index, or are otherwise tagged as being relevant, can then be used to rank or alter the ranking of the articles according to the previous-user relevancy scores under the groupings.

Personalized Queries

Another embodiment of the present invention keeps track of the full queries, or portions thereof such as key terms groupings, which are entered by users having certain personal data characteristics. In this embodiment, queries or portions thereof such as key term groupings, are stored within an index, preferably along with the personal data and a previous-user relevancy score for each query.

The previous-user relevancy score for a particular query or portion thereof can be: the number of times the query was entered by all users; the number of times a query was entered by unique users; the number of times a query was entered by a particular group of unique users sharing a particular personal data characteristic; the product, sum or average of the previous-user relevancy scores of all or some of the articles under the query or portion(s) thereof for all users, unique users or a particular group of users; the product, sum or average of the previous-user relevancy scores of all or some of the articles under the query or portion(s) thereof for all users, unique users or a particular group of users and the number of times a query was entered by all users all users, unique users or a particular group of users: or any combination of these or other indicators of relevancy of the particular query, or portions thereof, to a particular person or group having certain personal data characteristics. These previous-user relevancy scores for the queries, or portions thereof, can be normalized by factors such as time, number of previous users sharing a particular personal data characteristic, or otherwise by dividing or otherwise altering the raw scores by the normalizing factor or factors.

For example, queries, such as those containing the word "shoes," may be stored within the index, with a previous-user relevancy score in parentheses next to the query as follows:

| Index | |
|---|---|
| Shoes-Women (7) | A1 (5), A2 (4) , A3 (3) . . . |
| Shoes-Men (9) | A1 (3), A2 (1), A3 (3) . . . |
| Nike-Shoes-Women (3) | A4 (1), A5 (1), A6 (1) . . . |
| Nike-Shoes-Men (11) | A4 (5), A5 (4), A6 (3) . . . |
| Reebok-Shoes-Women (2) | A7 (1), A8 (1), A9 (3) . . . |
| Reebok-Shoes-Men (9) | A7 (5), A8 (4) , A9 (3) . . . |
| Converse-Shoes-Women (1) | A10 (1), A11 (1), A12 (1) . . . |
| Converse-Shoes-Men (8) | A10 (5), A11 (4) , A12 (3) . . . |
| Pump-Shoes-Women (14) | A13 (5) , A14 (4) , A15 (3) . . . |
| Pump-Shoes-Men (3) | A13 (1), A14 (1) , A15 (1) . . . |
| Enzo-Shoes-Women (12) | A16 (5), A17 (4) , A18 (3) . . . |
| Enzo-Shoes-Men (1) | A16 (1), A17 (1), A18 (1) . . . |
| Nine-West-Shoes-Women (16) | A19 (5), A20 (4), A21 (3) . . . |
| Nine-West-Shoes-Men (1) | A19 (1), A20 (1), A21 (1) . . . |

It may be desirable to maintain a separate index of just the narrower related key term groupings or queries and the previous-user relevancy scores such as:

| Index |
|---|
| Shoes-Women (7) |
| Shoes-Men (9) |
| Nike-Shoes-Women (3) |
| Nike-Shoes-Men (11) |
| Reebok-Shoes-Women (2) |
| Reebok-Shoes-Men (9) |
| Converse-Shoes-Women (1) |
| Converse-Shoes-Men (8) |
| Pump-Shoes-Women (14) |
| Pump-Shoes-Men (3) |
| Enzo-Shoes-Women (12) |
| Enzo-Shoes-Men (1) |
| Nine-West-Shoes-Women (16) |
| Nine-West-Shoes-Men (1) |

In addition, any amount of personal data can be included in the index. For example, an index including both gender and age may look like this:

| Index |
|---|
| Nike-Shoes-Women-Under30 (2) |
| Nike-Shoes-Women-Over30 (1) |
| Nike-Shoes-Men-Under30 (8) |
| Nike-Shoes-Men-Over30 (3) |
| Pump-Shoes-Women-Under30 (8) |
| Pump-Shoes-Women-Over30 (6) |
| Pump-Shoes-Men-Under30 (2) |
| Pump-Shoes-Men-Over30 (1) |

It is possible that not all queries, or portions thereof, will have different previous-user relevancy scores depending on the element of personal data considered. To save storage space and processing time, it is desirable to determine which personal data characteristics result in different rankings (as determined all, or at least in part, by the previous-user relevancy score) of the queries or portions thereof.

One way to determine which personal data characteristics result in different query rankings is to compare the previous-user relevancy scores, or ranking determined at least in part by the previous user relevancy scores, of queries, key terms or key term groupings in which a particular personal data characteristic is different. For example, the query or key term grouping such as "pump shoes" may have different relevancy scores depending on whether the previous searchers were women or men, whereas the rankings may not be different for a personal data characteristic such as profession.

For example, the index for the following key term groupings for the key term "shoes," with the previous-user relevancy scores in parentheses, may look like this:

| Index | |
|---|---|
| Pump-Shoes-Women (14) | A1 (5), A2 (2), A3 (3), A4 (4), A5 (5) |
| Pump-Shoes-Men (1) | A1 (1), A2 (1), A3 (3), A4 (2), A5 (1) |
| Pump-Shoes-Doctor (12) | A1 (5), A2 (4), A3 (3), A4 (2), A5 (1) |
| Pump-Shoes-Lawyer (12) | A1 (5), A2 (4), A3 (3), A4 (2), A5 (1) |

Here, the previous-user relevancy scores of the queries or groupings Pump-Shoes-Men and Pump-Shoes-Women are different, whereas the previous-user relevancy scores of the queries or groupings Pump-Shoes-Doctor and Pump-Shoes- Lawyer are somewhat similar. The personal data of gender (i.e. male or female) is then considered relevant. The magnitude of difference in previous-user relevancy scores deemed appropriate to identify relevant personal data for a particular key term, grouping of key terms, or query is a variable that can be adjusted to make the system more or less sensitive to these differences.

For example, one standard might be if the rankings of five or more of the top 10 queries when ranked in any manner according to their previous-user relevancy scores are different, then the particular element of personal data can be deemed relevant.

When comparing different combinations of personal data, the aforementioned analysis is preferably performed on groupings in which one item of a similar type of personal data is varied. For example, the analysis may look at men compared to women (gender), republicans compared to democrats (political orientation), or certain professions compared to other professions (employment), etc. Personal data that is not relevant to creating differently ranked articles can be tagged, removed from the index or never stored in the index at all If two different items of personal data (such as gender and geographic region) are determined to create different lists of queries (or URLs) for a particular search request, then it can be assumed that the combination of these two items of personal data will result in a split as well. For example, if Shoes-Women results in a different list of queries (or URLs) than Shoes-Men (gender) when other items of personal data are held constant and/or varied in a known manner (such as varied within a certain predetermined range), and Shoes-Southeast results in a different list of queries (or URLs) than Shoes-Northwest (geographic region), then we can assume that Shoes-Women-Southeast, Shoes-Women-Northwest, Shoes-Men-Southeast, and Shoes-Men-Northwest are different and should be tagged as such or maintained within the index. Then, when someone having these two items of personal data enters a search request, the relevancy scores for articles under these key term groupings can be used to rank the articles for presentation to the second user.

Presenting Personalized Queries Related to a Search Request

As described in my earlier applications, when a new or second user enters a search query containing one or more words, the system can look for related key term groupings or queries that contain the original query or portions thereof and suggest those additional words, groupings, or queries or portions thereof, of the narrower related key term groupings or queries to refine the search. Preferably, the related key term groupings or queries will be narrower related key term groupings or queries, which are more narrow in scope.

In addition, the system can also identify narrower related queries or narrower related key term groupings which do not necessarily contain a word or term from the original search request, but which are nonetheless related to the request, such as by being synonyms r subsets or species of a broader category. For example, the query "High-Heels" can be identified as related to the subject "shoes" as a particular narrower query of the broader request "shoes." Accordingly, the query "High-Heels" should be considered along with other queries that actually contain the word "shoes." One way these queries related to the subject of the original search query, but which do not actually contain portions of the original search query can be identified is by first utilizing a thesaurus database of equivalent terms for terms in the original search query. Narrower queries or narrower key term groupings that contain one or more of these equivalent terms can then be identified as narrower related key term groupings.

To present personalized narrower related key term groupings to a user, the system can present the narrower related key term groupings that include not only at least a portion of the original search request, but also at least a portion of the user's personal data. These narrower related key term groupings can be presented in order of superiority according to their previous-user relevancy scores.

For example, when a woman enters the search request "shoes," the system can look for narrower related queries or key term groupings which contain or are related to the term "shoes" and which have been entered by previous users having similar personal data, such as that of being a "woman."

As seen from the following index, the top three narrower related key term groupings or queries related to the original query "shoes" for women, when ranked by their previous-user relevancy score, are "Nine West Shoes," "Pump-Shoes," "Enzo-Shoes."

| Index | |
|---|---|
| Shoes-Women (7) | A1 (5), A2 (4), A3 (3) . . . |
| Shoes-Men (9) | A1 (3), A2 (1), A3 (3) . . . |
| Nike-Shoes-Women (3) | A4 (1), A5 (1), A6 (1) . . . |
| Nike-Shoes-Men (11) | A4 (5), A5 (4), A6 (3) . . . |
| Reebok-Shoes-Women (2) | A7 (1), A8 (1), A9 (3) . . . |
| Reebok-Shoes-Men (9) | A7 (5), A8 (4), A9 (3) . . . |
| Converse-Shoes-Women (1) | A10 (1), A11 (1), A12 (1) . . . |
| Converse-Shoes-Men (8) | A10 (5), A11 (4), A12 (3) . . . |
| Pump-Shoes-Women (14) | A13 (5), A14 (4), A15 (3) . . . |
| Pump-Shoes-Men (3) | A13 (1), A14 (1), A15 (1) . . . |
| Enzo-Shoes-Women (12) | A16 (5), A17 (4), A18 (3) . . . |
| Enzo-Shoes-Men (1) | A16 (1), A17 (1), A18 (1) . . . |
| Nine-West-Shoes-Women (16) | A19 (5), A20 (4), A21 (3) . . . |
| Nine-West-Shoes-Men (1) | A19 (1), A20 (1), A21 (1) . . . |

Similarly, the top three narrower related key term groupings or queries related to the original query "shoes" for men, when ranked by their previous-user relevancy score, are "Nike Shoes," "Reebok Shoes," and "Converse Shoes."

Accordingly, the invention could present these narrower related key term groupings or queries to women or men entering the search request "shoes," respectively. Narrower related key term groupings or queries can be presented for other queries and for other people having certain personal data as well.

Personalized Search Results from Personalized Queries

To present personalized search results to a particular person searching with a particular term or query, the present invention may display a number of articles from a number of the narrower related key term groupings or queries which are ranked by their respective previous-user relevancy scores.

For example, a user having the personal data of being a woman who is searching for "shoes" can be shown the first few of the top ranked (by previous-user relevancy scores) articles from each of the first few of the top ranked (by previous-user relevancy scores) narrower related key term groupings or queries. In this example, the top ranked narrower related key term groupings or queries for women are "Pump Shoes," "Enzo Shoes," and "Nine West Shoes." Displaying the top few (i.e. 3, more or less) articles from these narrower related key term groupings or queries, ranked according to their respective previous-user relevancy score, in response to the search request of "shoes" from a woman results in the following list of articles (when considering only the previous-user relevancy scores for the articles under these narrower related key term groupings or queries):

A13(5), A16(5), A19(5), A14(4), A17(4), A20(4), A15(3), A18(3), A21(3).

| Index | |
|---|---|
| Pump-Shoes-Women (14) | A13 (5), A14 (4), A15 (3) ... |
| Enzo-Shoes-Women (12) | A16 (5), A17 (4), A18 (3) ... |
| Nine-West-Shoes-Women (16) | A19 (5), A20 (4), A21 (3) ... |

It is also possible to consider both the previous-user relevancy score of the top narrower related key term groupings or queries, as well as the previous-user relevancy score of the articles under these narrower related key term groupings or queries. In this respect, the previous-user relevancy score of the top narrower related key term groupings or queries and the previous-user relevancy score of the articles under these narrower related key term groupings or queries can be combined in any possible manner, such as by adding, multiplying, or averaging together When the previous-user relevancy score of the top narrower related key term groupings or queries is multiplied with the previous-user relevancy score of the articles under these narrower related key term groupings or queries for the search request of "shoes" from a woman, for example, the following list of articles results: A19(80), A13(70), A20(64), A16(60), A14(56), A17(48), A21(48), A15(42), A18(36).

These articles can then be presented to the woman user entering the search request "shoes." Also, these computations described above can be completed offline or otherwise to populate, replace the articles, or update the previous-user relevancy scores under the queries or key term groupings, such as Shoes-Women, for example.

Implementation

The implementation notes of my previous applications are hereby incorporated by reference.

The personal data, scores for determining the personal data based on personal activity, etc can be stored in the form of what are commonly known in the computer industry as "cookies."

The method can allow the index to further associate a key term total score with each key term score; alter the index such that the key term score for the selected article under at least one of the first matched key terms is altered relative to other key term scores; and alter the index such that key term total scores of at least one of the articles related to the first search query under at least one of the first matched key terms a e altered relative to other key term total scores, but only for articles that have had their squibs displayed to the first user.

The method can also alter the index such that the key term score for the selected article under at least one of the first personal data elements is altered relative to other key term scores; and alter the index such that key term total scores of at least one of the articles related to the first search query under at least one of the first matched personal data elements are altered relative to other key term total scores, but only for articles that have had their squibs displayed to the first user.

The method can also add a positive score to the key term scores for the selected article under at least one of the first matched key terms; and add a positive score to the key term scores for the selected article under at least one of the first matched personal data elements.

The method can also add a positive score to the key term scores for the selected article under all the first matched key terms; and add a positive score to the key term scores for the selected article under all the first matched personal data elements.

The method can also allow the first user to select at least one of the articles related to the first search query through any action allowing the first user to sense more than just the squib of the at least one of the articles related to the first search query, the article selected by the first user being a selected article.

The method can also allows the user to select at least one of the articles related to the first search query by clicking on a hypertext link portion of the squib of the at least one of the articles related to the first search query, the article selected by the user being a selected article.

The method can also allow the user to select at least one of the articles related to the first search query by opening the at least one of the articles related to the first search query, the article selected by the first user being a selected article.

The method can also allow the user to select at least one of the articles by retrieving the at least one of the articles related to the first search query from a remote server, the article selected by the first user being a selected article.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in form, function and manner of operation, implementation and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A process of modifying an index that includes categories of personal data comprising:
    a) tracking user activity for articles contained in said index for query terms;
    b) combining index entries for categories of personal data when said user activity is not significantly different for a said query term for two or more categories of personal data.

2. The process of claim 1 wherein the measure of whether said user activity is significantly different comprises determining whether more than five of the top ten of said articles ranked in said index are different between said query term with one of said personal data categories and said query term with a second personal data category.

3. A process of displaying results in response to a query utilizing an index wherein articles are indexed based on query terms and personal data related to past users, wherein the index contains entries that have been combined based on similarity of past user activity with respect to results from searches, wherein the past users had different personal data associated with said users, but selected the same articles provided in response to similar query terms.

4. A database wherein the index to said database is modified by combining query term results for different personal data categories when prior results for the query term results are not significantly different for at least two different personal data categories.

* * * * *